(Model.)

A. B. BATSON.
VEGETABLE SLICER.

No. 279,212. Patented June 12, 1883.

Witnesses:
Henry Eichling
A. S. Fitch

Inventor
Alonzo B. Batson
By H. Fitch
Atty.

UNITED STATES PATENT OFFICE.

ALONZO B. BATSON, OF NEW CASTLE, INDIANA.

VEGETABLE-SLICER.

SPECIFICATION forming part of Letters Patent No. 279,212, dated June 12, 1883.

Application filed January 2, 1883. (Model.)

*To all whom it may concern:*

Be it known that I, ALONZO B. BATSON, of New Castle, Henry county, State of Indiana, and a citizen of the United States, have invented an Improved Vegetable-Slicer, of which the following is a full, clear, and exact description, reference being had to the accompanying drawings, forming part of this specification.

My invention relates to a machine or apparatus for rapidly slicing vegetables or analogous substances; and it consists in the combination of devices hereinafter particularly described, and constructed to operate as specified.

Figure 1:
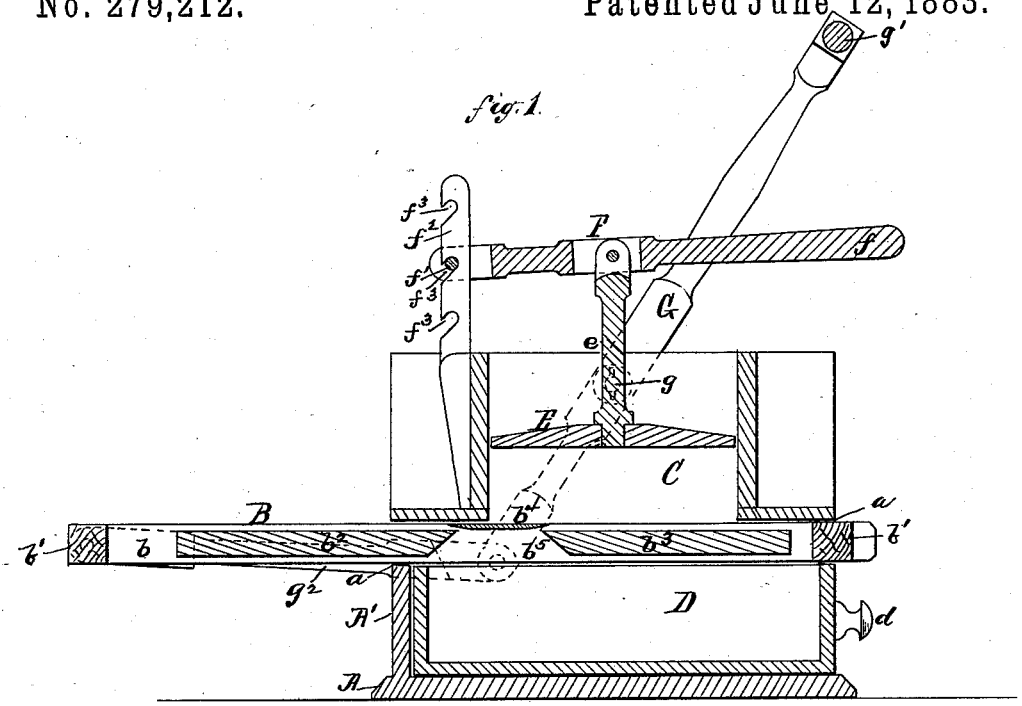
Figure 2:
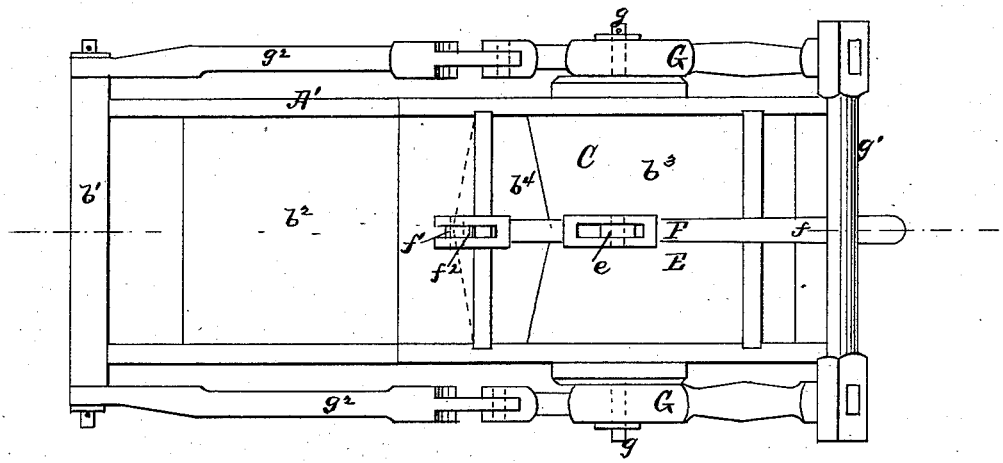

Figure 1 is a vertical central section of an apparatus embodying my invention, and Fig. 2 is a plan of the apparatus.

A is the base upon which the apparatus is mounted. A' is the frame rising from said base. Within this frame, and arranged to have a reciprocating horizontal motion, is mounted a frame, B, which is composed of the sides $b$, working in ways $a$ in the main frame A', the end cross-ties, $b'$, the tables $b^2$ and $b^3$, one at each end of the frame, and the double-edged knife or cutter $b^4$ in the opening $b^5$, between the said tables at or near the center of the frame B. Above the reciprocating cutter-frame B, in the bottomless box or hopper C, fixed on the frame A', and below the said frame B, is the receptacle D, which is in the form of a drawer, removable from the frame A', and is furnished with a suitable pull or handle, $d$.

E is a presser-plate, which is suspended within the hopper C by a link or arm, $e$, pivoted to a lever, F, which has a handle, $f$, at one end, and at the opposite end is furnished with a pin, $f'$, by means of which it may be engaged to a fulcrum-post, $f^2$, which is fixed on the exterior of the hopper, and is provided with a series of notches, $f^3$, adapted to receive the pin $f'$. The reciprocating cutter-frame B is actuated by means of the levers G, one of which is pivoted at $g$ on either side of the frame A', and the two being united at their upper ends by means of the cross-bar or handle $g'$, while their lower ends on each side are connected by the links $g^2$ to the exterior sides of the frame B, at one end thereof, as shown. If it is desired, a single lever G and its connections may be employed or a crank and pinion gearing may be used to impart the reciprocatory motion to the frame B.

It is evident that when a vegetable—such as a cabbage—is placed in the hopper C, and the presser-plate E is brought down upon it, the vegetable will be forced into close contact with one of the tables $b^2$ or $b^3$, and then that when the frame B is reciprocated by means of the levers G the knife or cutter $b^4$ will be drawn across the surface of the vegetable and will cut therefrom slices, which will drop through the opening $b^5$ into the receptacle D. It is evident, also, that as the slicing proceeds the vegetable may be forced downward upon the cutter by means of the presser-plate E until the vegetable is entirely sliced up; and the lever carrying the presser-plate, being adjustable on the fulcrum-post, as shown, either large or small vegetables may be sliced in the machine.

What I claim as my invention, and desire to secure by Letters Patent, is—

The combination, with the base A and main frame A', of the horizontally-reciprocating cutter-frame B, working in ways $a$ and composed of the sides $b$, ends $b'$, tables $b^2$ and $b^3$, and carrying the cutter $b^4$ in the opening $b^5$; together with the hopper C and its presser-plate E, suspended from lever F, which has fulcrum-pin $f'$ working in post $f^2$, having notches $f^3$, and the removable receptacle D below the cutter, all constructed and arranged to operate as and for the purpose specified.

ALONZO B. BATSON.

Witnesses:
JACOB SWIGART, Jr.,
WILLIAM H. ELLIOTT.